(12) United States Patent
Shimbo et al.

(10) Patent No.: US 6,220,540 B1
(45) Date of Patent: Apr. 24, 2001

(54) MECHANISM FOR RETAINING ONE TAPE DECK IN INOPERATIVE POSITION IN DOUBLE CASSETTE TAPE PLAYER

(75) Inventors: Takaichi Shimbo, Iruma; Masayuki Goto, Fussa, both of (JP)

(73) Assignee: MEC Co. Ltd. (JP)

( * ) Notice: Subject to any disclaimer, the term of this patent is extended or adjusted under 35 U.S.C. 154(b) by 0 days.

(21) Appl. No.: 09/518,375

(22) Filed: Mar. 3, 2000

(51) Int. Cl.$^7$ ................................................. G03B 23/02
(52) U.S. Cl. ........................ 242/337.1; 360/96.3; 360/132
(58) Field of Search ........................... 242/337, 337.1; 360/132, 92, 96.3, 96.4

(56) References Cited

U.S. PATENT DOCUMENTS

| | | |
|---|---|---|
| 4,935,831 | 6/1990 | Shimbo . |
| 5,363,259 | * 11/1994 | Narita ................... 360/96.3 |
| 5,570,253 | * 10/1996 | Lee ....................... 360/96.3 |
| 5,719,728 | * 2/1998 | Miyazaki ............... 360/96.3 |
| 5,784,221 | * 7/1998 | Lee ....................... 360/132 |

* cited by examiner

Primary Examiner—Emmanuel M. Marcelo
(74) Attorney, Agent, or Firm—Rothwell, Figg, Ernst & Manbeck (57) ABSTRACT

A mechanism for retaining one tape deck (12), of a double cassette tape player (14), into a temporal inoperative position, which comprises a trigger arm (40) rotatable about a first pivot (41) on a chassis (15) of the tape deck; a first spring (42) for biasing the trigger arm to rotate in a predetermined direction; a pause lever (50) slideable on the chassis of the tape deck; a second spring (54) for urging the pause lever to move in a predetermined direction; and actuating structure or a push lever (38) that is made operative in response to rotation of the motor to urge the trigger arm to rotate in an opposite direction against the first spring. The pause lever is allowed to be slid in the predetermined direction by the second spring when the trigger arm is caused by the push lever to rotate in the opposite direction. The mechanism further comprises a lock structure (55) provided at a tip end of the pause lever for engagement with an axis pin (31) of the rotation transmission gear (32), when the pause lever is slid in the opposite direction, thereby locking the rotation transmission gear in a lock position just before a position where it meshes with a reel drive gear (36). Accordingly, the rotation transmission gear idles in the lock position while it is kept driven by a motor (16).

9 Claims, 11 Drawing Sheets

MECHANISM FOR RETAINING ONE TAPE DECK IN INOPERATIVE POSITION IN DOUBLE CASSETTE TAPE PLAYER

BACKGROUND OF THE INVENTION

1. Field of the Invention

The present invention relates in general to a so-called double cassette tape player having a pair of tape decks, and more particularly to a mechanism for retaining one of the two tape decks in the double cassette tape player in its inoperative position, while both tape decks being driven by a single power source.

2. Description of the Prior Art

The double cassette tape player has been known in the art, which comprises a pair of tape decks, each being designed substantially as a single type tape player, and a drive mechanism for driving the two decks. The tape player of this type is particularly useful for dubbing from a recorded tape cassette on one deck (sub-deck) to a raw tape cassette on the other deck (main deck). In response to single key operation by the user, both tape decks are driven synchronously. Of course, the sub-deck carrying the recorded tape cassette operates for playback and the main deck carrying the raw tape cassette operates for recording. Such dubbing operation with the double cassette tape player should be compared with the same operation using two separate cassette tape player, which needs connection between the two players and synchronous key operation on both players.

With the double cassette tape player, both tape decks should be driven simultaneously during the dubbing operation. Apart from dubbing, however, only the main deck is driven, the sub-deck being made inoperative. For example, should both tape decks, each carrying the recorded tape cassette, be driven simultaneously in response to the user's key operation which commands playback, both tape decks would run for playback of different music data. To cope with this problem, the double cassette tape player should be designed such that the sub-deck is used only for dubbing and is made inoperative when another kind of operation is designated by the user.

This requirement can be fulfilled by employing separate drive sources for individually driving the two tape decks. This requires two motors which should be controlled by separate drive control circuits. It should raise a manufacturing cost and needs a larger space for mounting the motors and circuits. Moreover, a synchronizer is additionally required to drive the two motors synchronously at the time of dubbing operation, which complicates the overall construction and arrangement and further increases the manufacturing cost of the double cassette tape player.

One of the inventors have already invented the cassette tape drive mechanism in a single type cassette tape player, which is patented as U.S. Pat. No. 4,935,831, the disclosure of which is hereby incorporated for reference. This drive mechanism has an idle gear rotatable on a pin at the leading end position of a rotary arm that is driven by a motor. The idle gear will mesh with a semi-circular inner gear. When the idle gear separates from one end of the inner gear, it then meshes with a forward or reverse reel drive gear so that a cassette tape carried on the tape player is to run in a forward or reverse direction. Movement of the idle gear toward the end of the inner gear will also move a head plate toward its operative position where one of pinch rollers is in press-contact with a corresponding capstan, between which the cassette tape travels in the forward or reverse direction.

Such drive mechanism is simple in construction and arrangement and can be manufactured at a relatively low cost. However, when this drive mechanism is applied to each of the tape decks in the double cassette tape player with a single drive source or motor, as described above, both tape decks are always driven simultaneously by the single motor, which might cause any trouble and disadvantage at the time of operation other than dubbing.

Accordingly, it is desirable to provide a mechanism for retaining one tape deck in its inoperative position, when so demanded, in a double cassette tape player in which both tape decks may be simultaneously driven by a single drive source through the above-described drive mechanism proposed by the inventor.

SUMMARY OF THE INVENTION

Accordingly, it is a principal object of the present invention to provide a novel mechanism for interrupting one of two rotation transmission routes from a single drive source so that one deck of a double cassette tape player may be retained in an inoperative position while the other is driven by the drive source through another rotation transmission route.

In accordance with an aspect of the present invention, in a double cassette tape player having a single motor rotatable in forward and reverse directions and a pair of tape decks that can be driven by the motor through separate drive mechanisms, each of the drive mechanisms including a rotation transmission gear which is driven by the motor and capable of meshing with one of reel drive gears so that a tape in a cassette carried on the tape deck is to run in a predetermined direction, there is provided a mechanism for retaining one of the tape decks into a temporal inoperative position where the rotation transmission gear does not mesh with the reel drive gear, comprising a trigger arm rotatable about a first pivot on a chassis of the one tape deck; first spring means for biasing the trigger arm to rotate in a predetermined direction; a pause lever slideable on the chassis of the one tape deck; second spring means for urging the pause lever to move in a predetermined direction; actuator means that is made operative in response to rotation of the motor to urge the trigger arm to rotate in a direction opposite to the predetermined direction of rotation, against the biasing force of the first spring means; the pause lever being allowed to be slid in the predetermined direction by the biasing force of the second spring means when the trigger arm is caused by the actuator means to rotate in the opposite direction; and lock means provided at a tip end of the pause lever for engagement with a part of the drive mechanism between the motor and the rotation transmission gear, when the pause lever is slid in the predetermined direction, thereby locking the rotation transmission gear in a lock position just before a position where it meshes with the reel drive gear, the rotation transmission gear being idle in the lock position while being kept driven by the motor.

The actuator means may comprise a push lever rotatable about a second pivot on the chassis of the one tape deck. The push lever is rotated in a predetermined direction in response to movement of the rotation transmission gear by rotation of the motor. The push lever has an integral part engageable with one extreme end of the trigger arm.

The mechanism may further comprise positioning means for keeping the trigger arm into a predetermined angle of rotation, when the trigger arm is rotated in the opposite direction by the actuator means. The positioning means may comprise a solenoid of a permanent magnetic type, The solenoid is empowered with electricity to release its magnetic power, which allows the trigger arm to rotate in the predetermined direction of rotation in cooperation with the first spring. Therefore, the pause lever is urged to be slid in a direction opposite to the predetermined direction of movement, against the biasing force of the second spring means, thereby releasing the rotation transmission gear from the lock position. The lock means may comprises a recess formed at the tip end of the pause lever for receiving a first pin that provides an axis of rotation of the rotation transmission gear.

In a preferable embodiment, the tip end of the pause lever provides an inclined edge adjacent below to the recess. The inclined edge is in contact with the first pin, just before the pin is to be received within the recess, and acting as a guide to urge the pause lever to be slid in the opposite direction, while maintaining the trigger arm in the predetermined angle of rotation defined by the positioning means.

In another preferable embodiment, the mechanism further comprises interlocking means consisting of a first member integral with the trigger arm and a second member integral with the pause lever. The first and second members is usually in contact with each other.

The first member may be a first extension of the trigger arm and the second member may be a second pin at one extreme end of the pause lever, wherein the second pin is usually interposed between the first extension and the second spring means.

The second spring means may comprise an elongated second extension spaced, substantially in parallel with the first extension of the trigger arm, wherein the second pin is interposed between the first and second extensions.

The double cassette tape player may have one tape deck having only a playback capacity and another tape deck with playback and recording capacity. The mechanism of the present invention is applied at least to the drive mechanism on one of the tape decks which may be the former with the playback capacity. Alternatively, the mechanism of the present invention may be applied onto both tape decks of the double cassette tape player.

BRIEF DESCRIPTION OF THE DRAWINGS

Other objects and advantages of the present invention can be better understood from the following description when read in conjunction with the accompanying drawings in which.

DETAILED DESCRIPTION OF THE PREFERRED EMBODIMENTS

Figure 1:
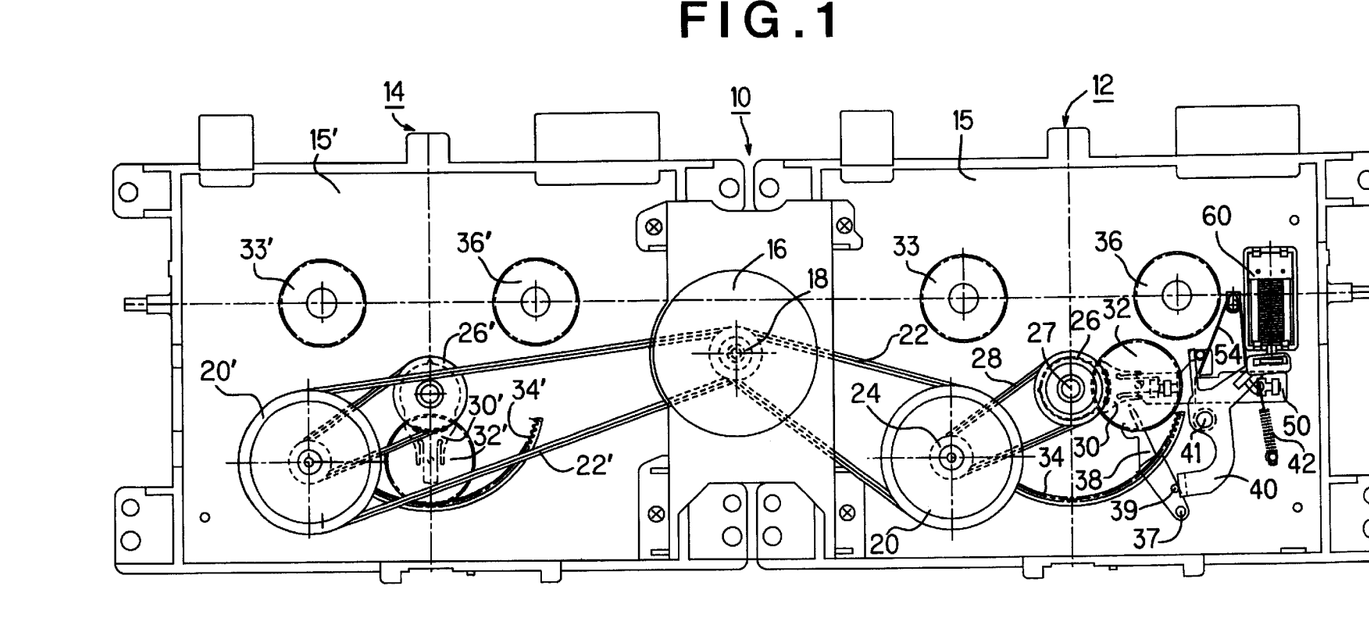
FIG. 1 is a bottom view of a double cassette tape player including a mechanism in accordance with an embodiment of the present invention which retains one of two tape decks in an inoperative position.

Specifically referring to FIG. 1 illustrating the bottom of a double cassette tape player 10 having a tape deck 12 shown at the right is a player and another tape deck 14 shown at the left is a player/recorder. Tape deck 12 is used only at the time of dubbing. When dubbing, the recorded tape in a cassette carried on tape deck 12 is played back, which is recorded and copied to a raw tape in another cassette carried on tape deck 14. Apart from dubbing, tape deck 12 is retained in its inoperative position and tape deck 14 is only used for playback, fast forwarding and rewinding of the tape cassette that is carried thereon. Also, tape deck 14 is solely used for recording the sound data from an external instrument.

Tape decks 12 and 14 may be driven by a single motor 16 so that they operate in synchronism with each other at the time of dubbing. When, at the time of operation other than dubbing, tape deck 14 is solely used and tape deck 12 should be retained in the inoperative position, which is achieved by a mechanism according to the present invention, an embodiment of which is built in tape deck 12. Tape deck 12 takes the inoperative position, shown in FIG. 1, except that it is used for dubbing. In this embodiment, tape deck 12 is initialized into this position. When player 10 is empowered, tape deck 12 that may take another position at this time is automatically moved to this inoperative position and retained thereat. If the user pushes a key or button (not shown) to command dubbing, deck 12 is unlocked from the inoperative position and now allowed to perform playback operation in synchronism with recording operation of deck 14.

In this embodiment, tape decks 12, 14 are driven by motor 16 through substantially the same drive mechanisms. This drive mechanism is specifically disclosed in the U.S. Pat. No. 4,935,831, incorporated herein by reference. However, the drive mechanism of deck 12 differs from that of deck 14 in that it additionally involves a trigger arm 40, a pause lever 50, a solenoid 60 and other parts and members related thereto, which will be hereinbelow described in detail.

Motor 16 is rotatable in forward and reverse directions. Main belts 22, 22' are wrapped between a pulley 18 secured to the output shaft of motor 16 and flywheels 20, 20' so that flywheels 20, 20' rotates with motor 16 in the same direction.

Figure 2:
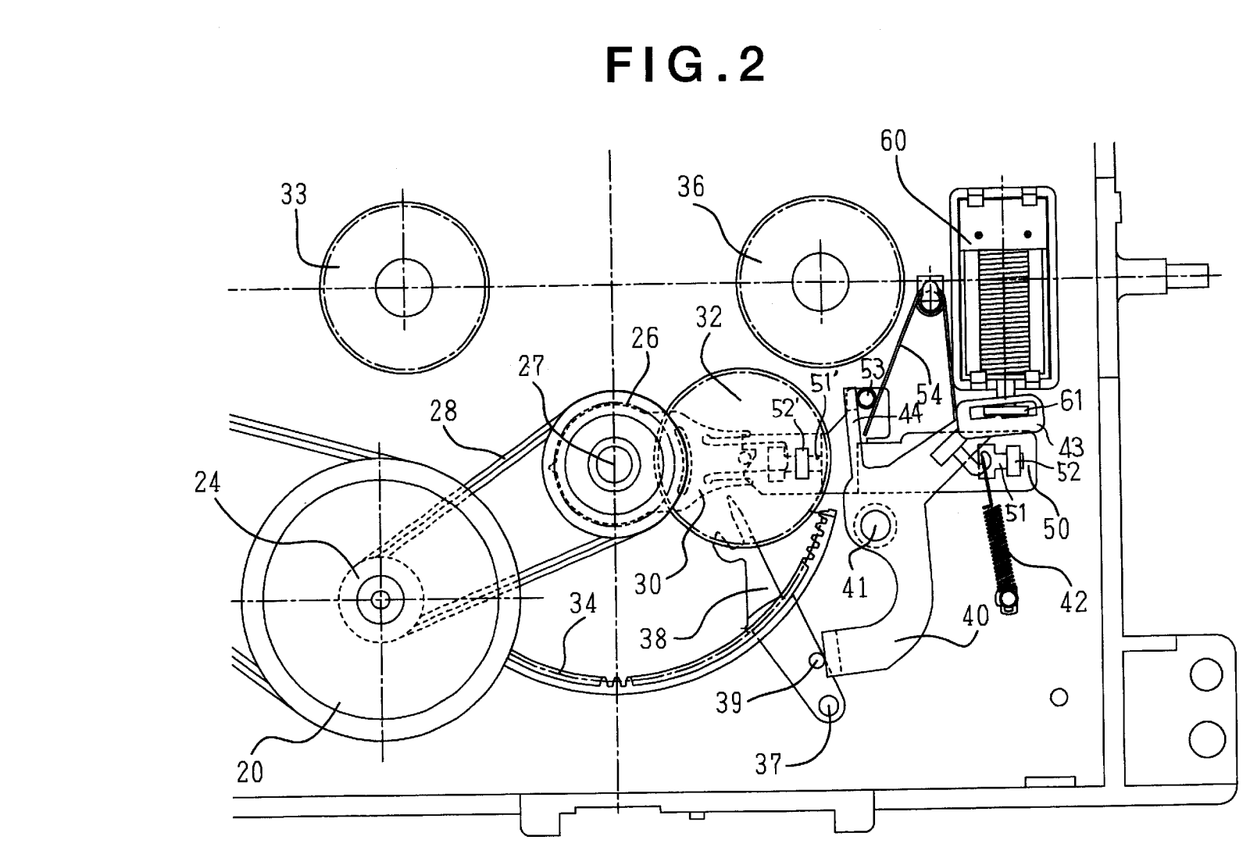
FIG. 2 is an enlarged bottom view showing positional relationship between various parts and members on the tape deck that is retained in the inoperative position.
Figure 3:
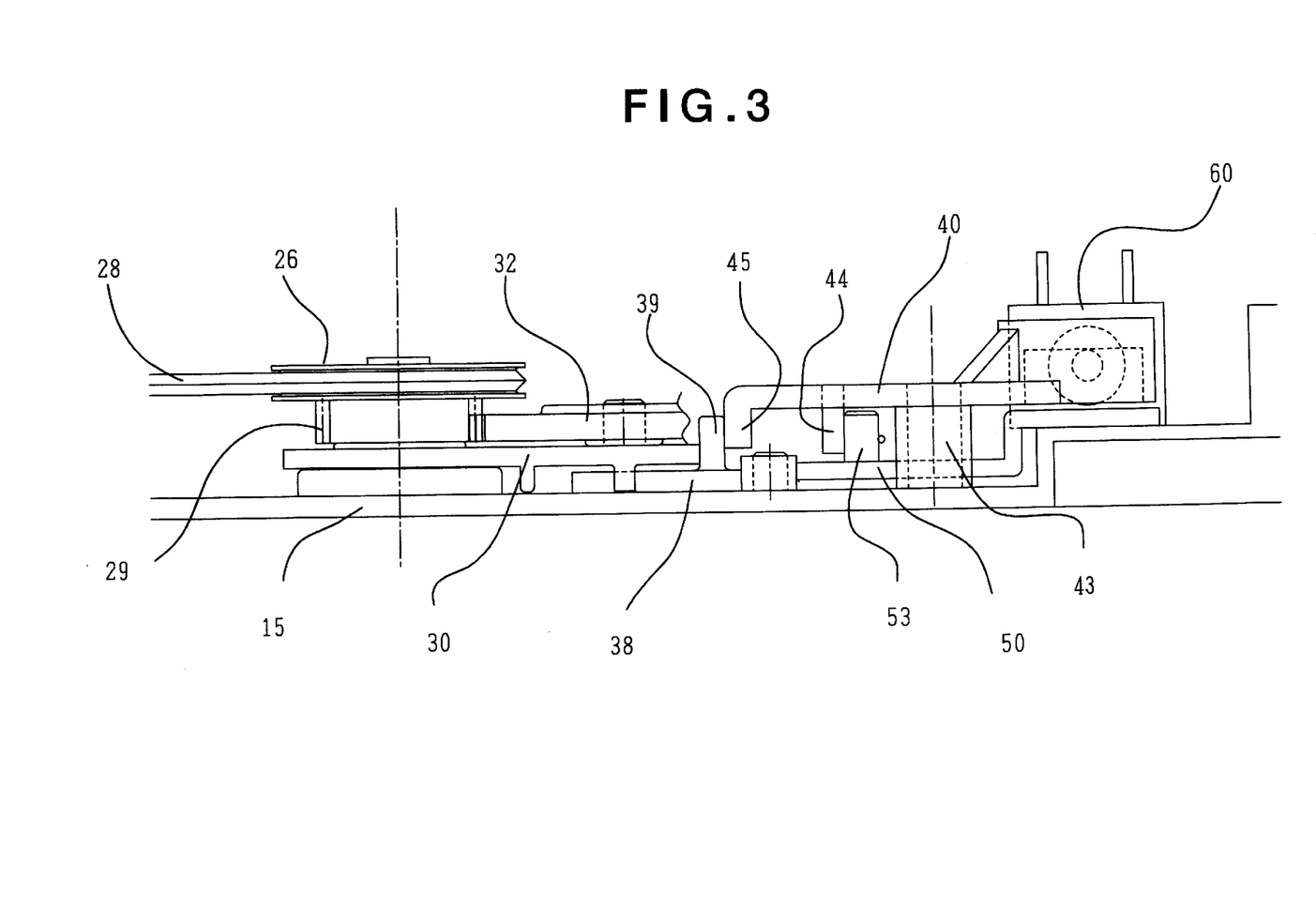
FIG. 3 is a partial side view of the double cassette tape player of FIG. 1.

Reference now to FIGS. 2 and 3 as well as to FIG. 1, on a chassis 15 of deck 12, a sub-belt 28 is wrapped between a small-diameter pulley 24 concentrically secured to flywheel 20 and a center pulley 26. To a rotation shaft 27 of center pulley 26 is fixed a rotary arm 30 that swings with rotation of center pulley 26. A rotation transmission gear 32, rotatable about a pin 31 at the leading end of rotary arm 30, always meshes with a center pulley gear 29 concentric with center pulley 26. Gear 32 is engageable with an inner gear 34 formed on the underside of chassis 15 to extend substantially a semi-circle that is concentric with center pulley 26. Gear 32 is also engageable with a rewind reel drive gear 36 that is integral with a rewind reel (not shown) extending upward from chassis 15.

With the above-described arrangement, when motor 16 rotates in a forward direction or in a counterclockwise direction in the drawings, its rotation is transmitted via belts 22, 28 to center pulley 26 to rotate said pulley in the same direction, so that rotation transmission gear 32 revolves clockwise and moves to the right upward along inner gear 34. In the inoperative position of deck 12 shown in FIGS. 1 and 2, rotation transmission gear 32 is moved away from the right upward end of inner gear 34 but does not come into mesh with rewind reel drive gear 36. In other words, gear 32 idles at a neutral position between inner gear 34 and rewind reel drive gear 36.

A push arm 38 is pivottable about a stationary pin 37 extending down from the bottom of chassis 15. Push arm 38 includes a pin 39 engageable with an upstanding wall 45 at one extreme end of trigger arm 40. The free end of push arm 38 is shaped into a fork 35 for engagement with pin 31 at the leading end of rotary arm 30. When rotation transmission gear 32 moves right upward along inner gear 34, push arm 38 revolves clockwise about pin 37 due to engagement between pin 31 and the forked end 35. However, as described later, because pin 31 separates the forked end 35 at some point, push arm 38 remains at a predetermined angle such as shown in FIGS. 1 and 2.

Trigger arm 40, also pivotable about a stationary pin 41 extending down from the bottom of chassis 15, is biased by a spring 42 to rotate clockwise. Another extreme end of trigger arm 40 is bent down to form an engagement piece 43 that is always in engagement with a piston end 61 of solenoid 60. Solenoid 60 used in this embodiment is of a permanent magnet type that provides a magnetic force attracting piston end 61. When the electricity is supplied to solenoid 60 through wires (not shown), the magnetic force disappears. The inoperative position of deck 12 illustrated in FIGS. 1 and 2 may be achieved when no electricity is supplied to solenoid 60 so that piston end 61 is attracted to cause trigger arm 40 to rotate counterclockwise against the biasing force of spring 42. Trigger arm 40 also has an upward extension 44 that is located at an angle more counterclockwise than engagement piece 43.

Beneath chassis 15 but above trigger arm 40, there is pause lever 50 that is slidable by engagement between lateral grooves 51, 51'and abutment protrusions of inverted T-shaped cross-section. Pause lever 50 has a downward pin 53 that is positioned between a spring 54 and upward extension 44 of trigger arm 40. Pause lever 50 is always biased by spring 54 to move to the left in the drawings.

The left-end portion of pause lever 50 has a recess 55 for receiving pin 31 at the end of rotary arm 30, and a lower cut-out edge 56 acting as a guide to pin 31 before it enters recess 55. In the inoperative position of deck 12 of FIGS. 1 and 2, pause lever 50 takes the leftmost position whereat pin 31 is received within recess 55, which causes rotation transmission gear 32 to idle in the neutral position between inner gear 34 and rewind reel drive gear 36.

Again, rotation of motor 16 is transmitted to gear 32 via main belt 22, flywheel 20, sub-belt 28, center pulley 26 and center pulley gear 29, so that gear 32 rotates about pin 31 and moves along inner gear 34.

Figure 4:
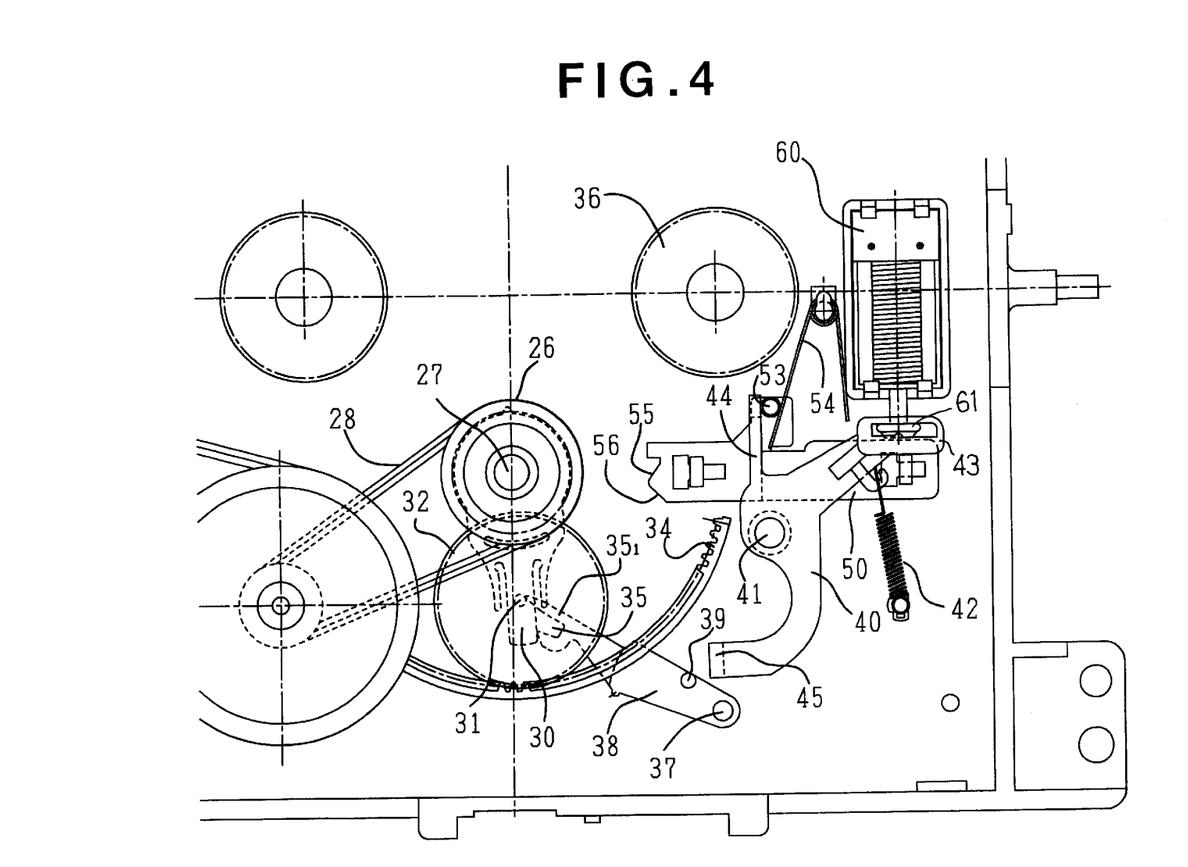
FIG. 4 through FIG. 6 are enlarged bottom views that correspond to FIG. 2 but shows the one tape deck having different positional relationship that change with rotation of a rotary arm.

Suppose that rotation transmission gear 32 is positioned at the lowermost position that is at a center of its semicircular path of travel along inner gear 34. In this position, forked ends 35 of push arms 38 does not engage with pin 31. When motor 16 starts to rotate counterclockwise, gear 32 begins rotating clockwise and moves upward right along inner gear 34. Soon after that, as specifically illustrated in FIG. 4, pin 31 contacts an outer leg 35i of forked end 35 so that push arm 38 rotates clockwise about shaft 37 in response to circular movement of gear 32 along inner gear 34. Further circular movement of gear 32 will achieve engagement between pin 39 on push arm 38 and upstanding wall 45 of trigger arm 40, thereby rotating trigger arm 44 counterclockwise about shaft 41. Accordingly, piston end 61 of solenoid 60, which is engaged by wall 43 of trigger arm 40, is attracted by the magnetic force of solenoid 60 so that trigger arm 40 takes a fixed orientation as shown in FIG. 5.

Figure 5:
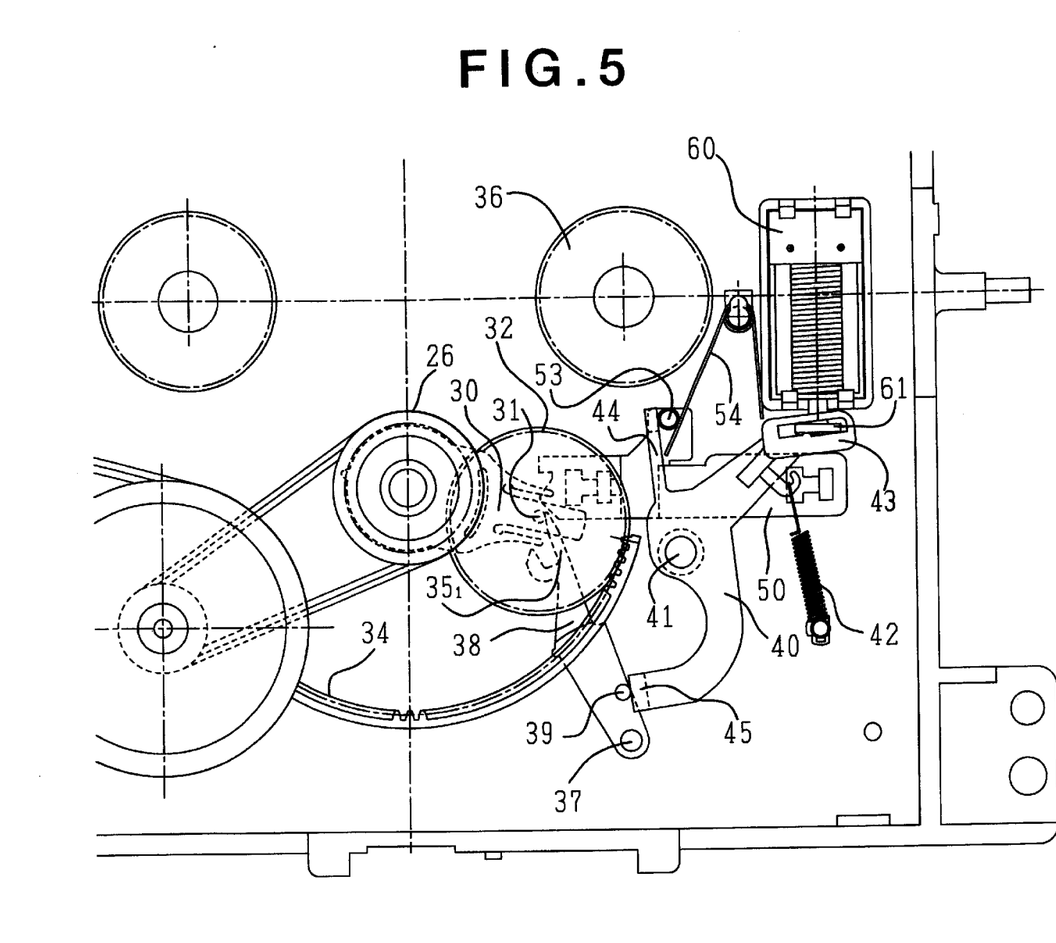

In FIG. 5, pin 31 has been moved to a position in close vicinity to the leading end of outer leg 35i. When rotary arm 30 further rotates counterclockwise, pin 31 soon separates leg 35i, so that push arm 38 remains standstill even if rotary arm 30 further rotates in the same direction. Pause lever 50 has been moved to the left from the position of FIG. 4 to that of FIG. 5 due to counterclockwise rotation of trigger arm 40 and the biasing force of spring 54 that engages with pin 53.

Figure 6:
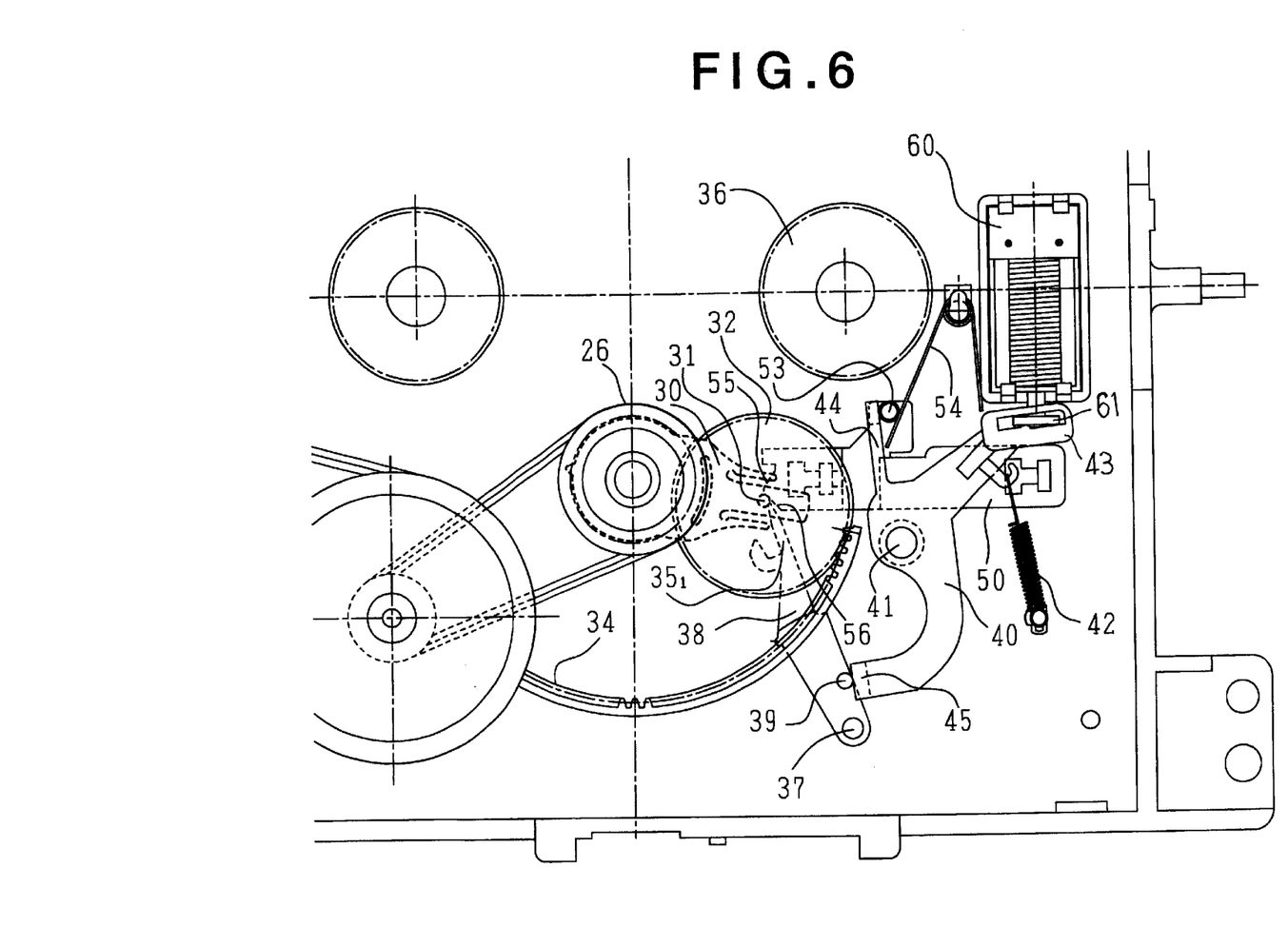

Still further counterclockwise rotation of rotary arm 30 will soon bring pin 31 into contact with lower cut-out edge 56 of pause lever 50, as specifically illustrated in FIG. 6, which urges pause lever 50 to move back to the right against the biasing force of spring 54. At this time, rotation transmission gear 32 still meshes with inner gear 34. Soon after pin 31 has climbed over the apex defined between recess 55 and cut-put edge 56, spring 54 urges pause lever 50 to move to the left so that pin 31 fits into recess 55. Substantially at the same time, rotation transmission gear 32 separates inner gear 34. Thus, gear 32 is locked in the neutral position of FIGS. 1 and 2 where it does not mesh with inner gear 34 nor with rewind reel drive gear 36 and, therefore, idles even when it receives drive energy from motor 16. This is herein called "inoperative position" of tape deck 12, which is maintained as far as trigger arm 40 takes the orientation where engagement wall 43 and piston end 61 are attracted by solenoid 60, as shown in FIGS. 5 and 6.

While tape deck 12 is in the inoperative position, the other tape deck 14 is used solely to execute playback, recording from the external source, fast-forward and rewinding of a cassette tape carried thereon may be executed.

Figure 7:
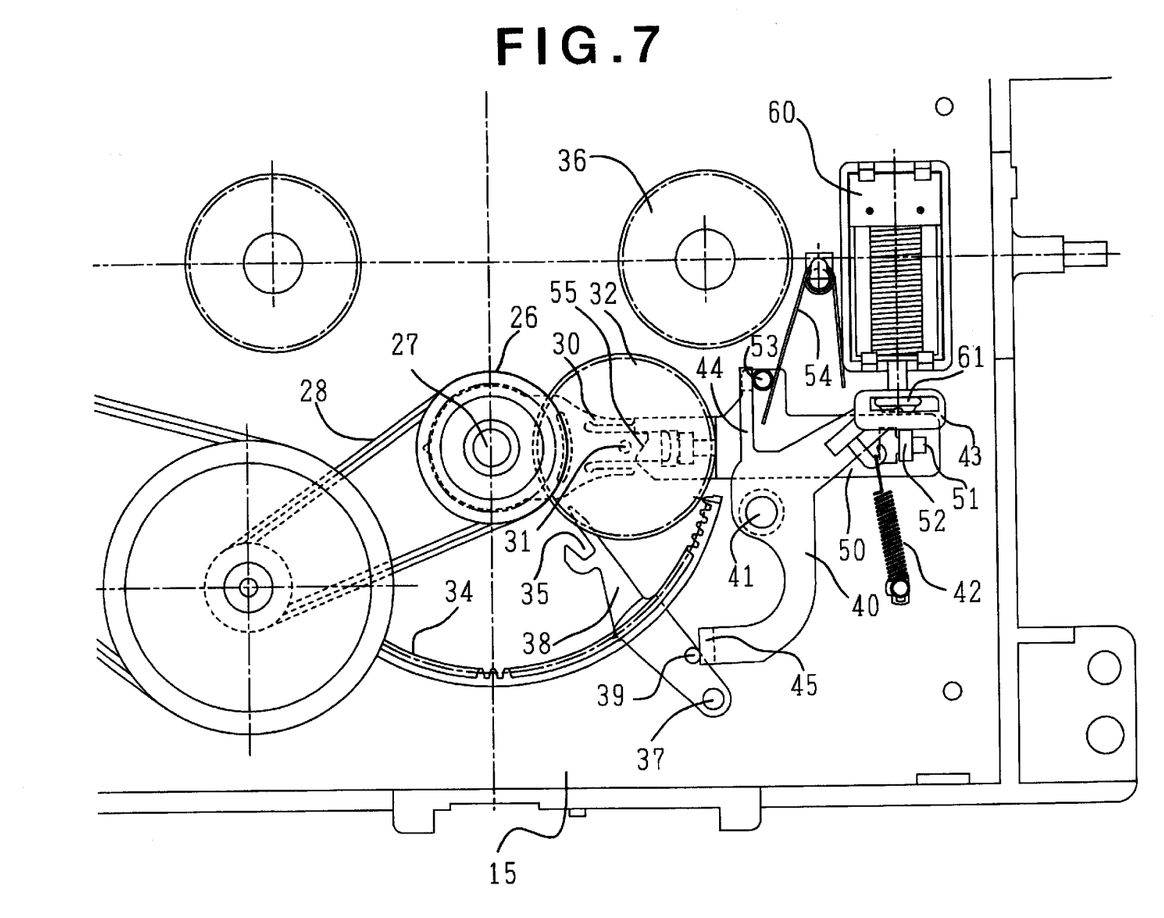
FIG. 7 is an enlarged bottom views that correspond to FIGS. 4–6 but shows the one tape deck that has just been unlocked from the inoperative position.
Figure 8:
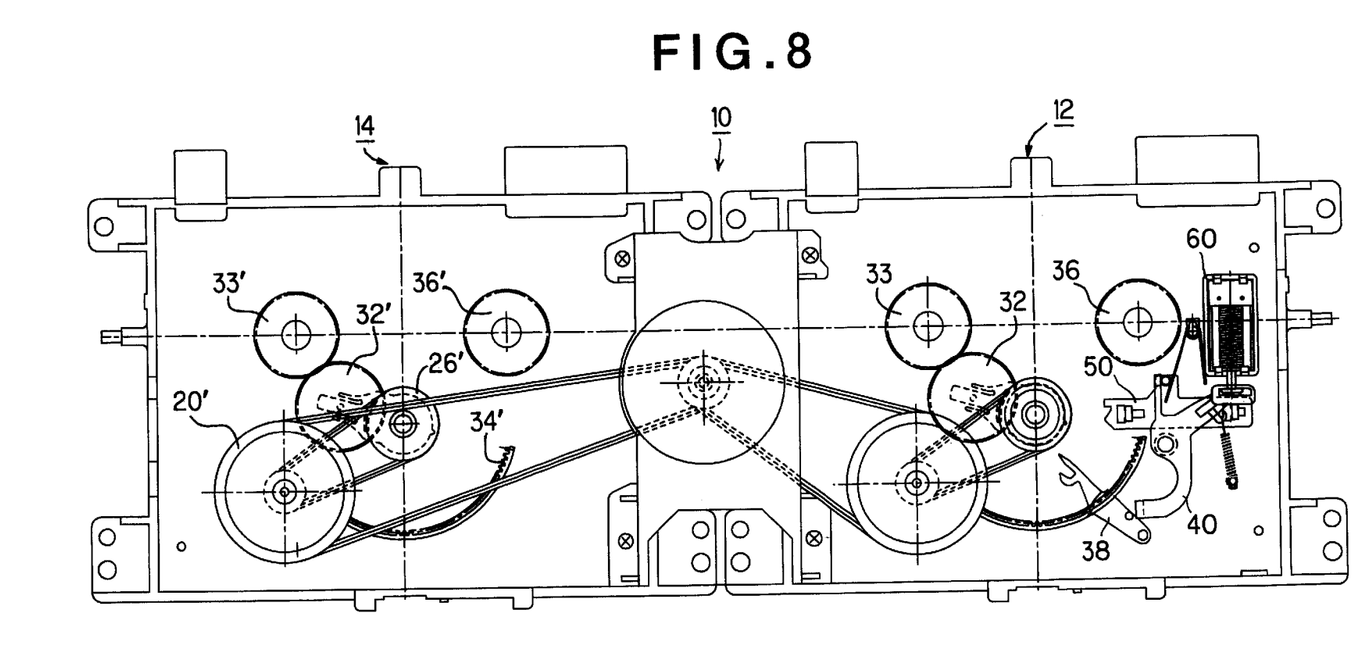
FIG. 8 is a bottom view of the double cassette tape player of FIG. 1 in which both tape decks are driven in synchronism with each other for dubbing operation.

When the user operates a specific key or button to command dubbing from the recorded tape cassette on deck 12 to the raw tape cassette on deck 14, solenoid 60 is energized to release the magnetic force, which allows trigger arm 40 to rotate clockwise about shaft 41 by spring 42. Accordingly, pause lever 50 is caused to move to the right, due to engagement between upstanding wall 44 of trigger arm 40 and pin 53 of pause lever 50, against the biasing force of spring 54, which disengages pin 31 from recess 55 so that rotation transmission gear 32 becomes free to move, as specifically illustrated in FIG. 7. When motor 16 starts clockwise rotation with this position, both decks 12 and 14 are driven by motor 16 in synchronism with each other. Rotation transmission gears 32, 32' are moved upward left along inner gears 34, 34', and become meshed with forward reel drive gears 33, 33' after separating the extreme ends of inner gears 34, 34' so that forward reel drive gears 33, 33' are rotated simultaneously, both in the forward direction, at the same speed, as shown in FIG. 8. Therefore, the cassette tapes on decks 12 and 14 run at the same travelling speed, the former being played back, which is magnetically recorded onto the latter.

Tape decks 12 and 14 respectively have head bases (not shown) that are movable above chassis 15, 15'. The head base of deck 12 carries a reproducing head, whereas the head base of deck 14 carries an integral reproducing/recording head. The head base of deck 14 may carry separate heads, one for playback and the other for recording. At the time of dubbing, both head bases are moved simultaneously to the operative position where forward pinch rollers (not shown) of both decks 12, 14 contact under pressure with adjacent capstans (not shown), between which the tape is to travel in the forward direction. When deck 14 is to be used solely, only the head base thereof takes the operative position. A mechanism for moving the head base does not relate directly with the subject matter of the present invention and, therefore, is not limited to any specific design. Only by way of example, a second push lever that is equivalent to push lever 38 is arranged at an opposite position (between flywheel 20, 20' and chassis 15, 15') and a pin (corresponding to pin 39) of the second push lever is adapted to engage with the head base. With this arrangement, clockwise rotation of motor 16 causes rotary arms 30, 30' to swing in the same direction, which, in turn, rotates the second push lever counterclockwise, thereby shifting the head base that is engaged by the pin of the second push lever.

Figure 9:
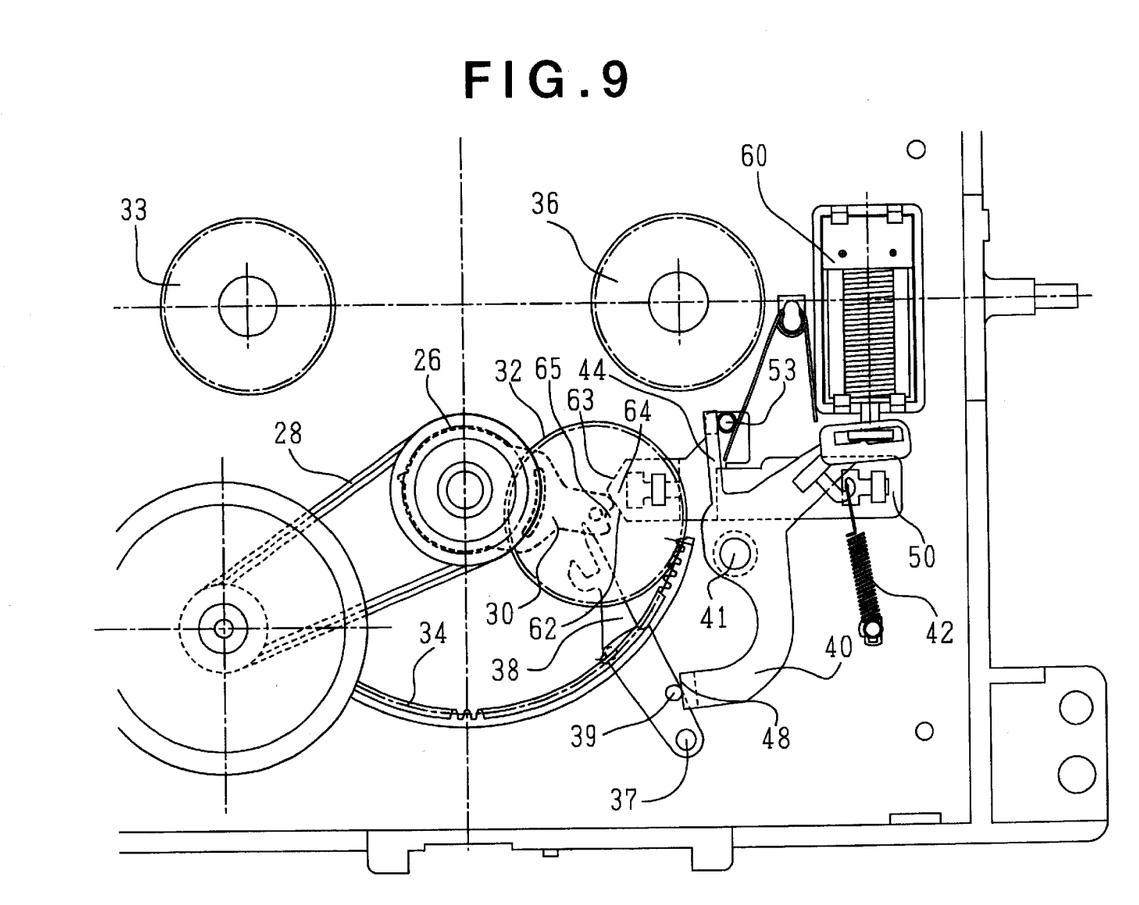
FIG. 9 is an enlarged bottom view showing another design of engagement between the rotary arm and the pause lever.

In the foregoing embodiment, pin 31 at the leading end of rotary arm 30 fits into recess 55 at the left end of pause lever 50 so that tape deck 12 is locked in the inoperative position. Any other arrangement may be used as far as it is capable of keeping rotation transmission gear 32 in the neutral, inoperative position where it does not mesh with inner gear 34 nor with rewind reel drive gear 36. FIG. 9 shows a modified embodiment in which the left end of pause lever is shaped as a triangular projection 64 including a lower cut-out edge 62 and an upper cut-out edge 63, and rotary arm 30 has a triangular recess 65 engageable with projection 64. In this embodiment, at least an upper corner at the end of rotary arm 30 should preferably be rounded, as shown in the drawing, which facilitates push-back of pause lever 50 by contact between the upper corner of rotary arm 30 and lower cut-out edge 62 of pause lever 50.

Figure 10:
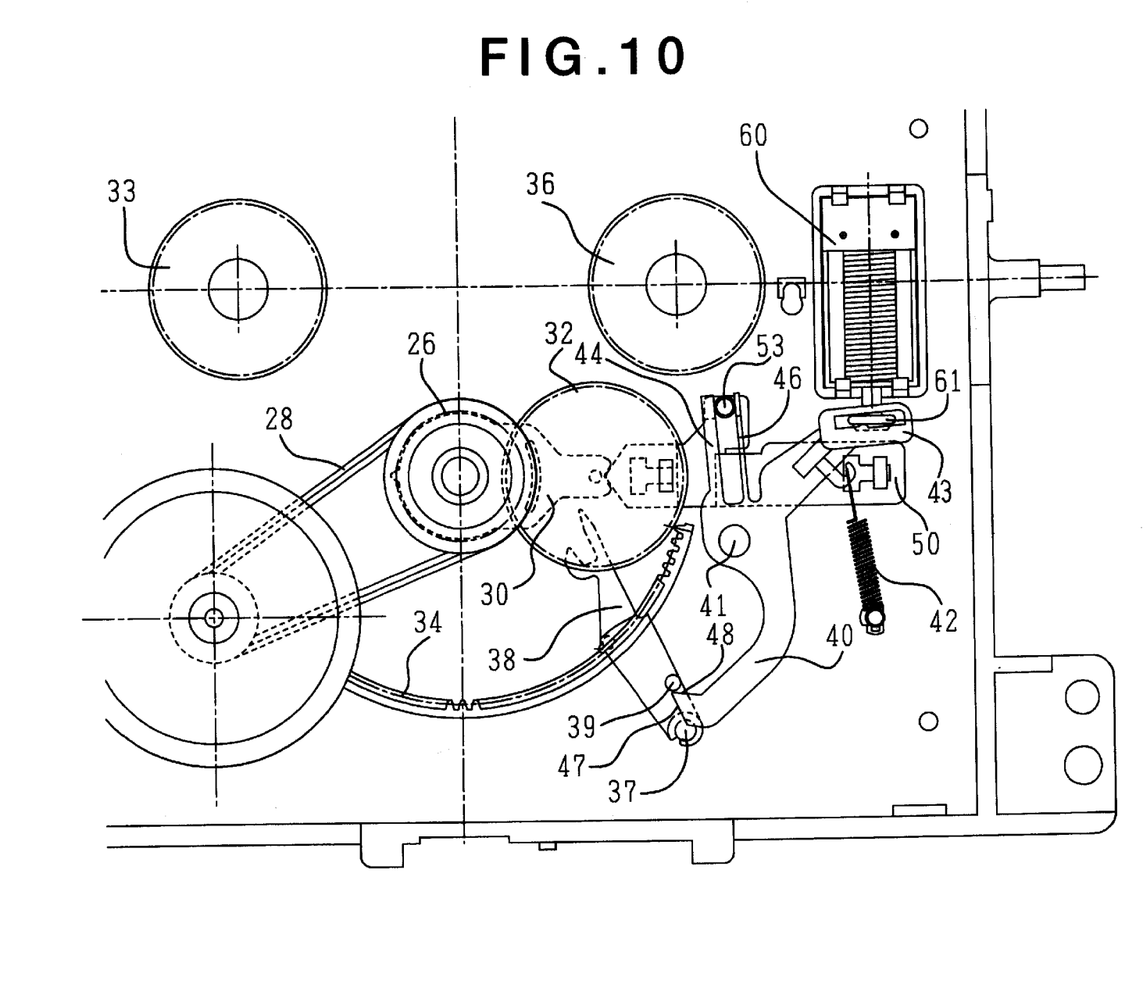
FIG. 10 is an enlarged bottom view showing one tape deck that is retained in the inoperative position through a mechanism according to a modified embodiment of the present invention.
Figure 11:
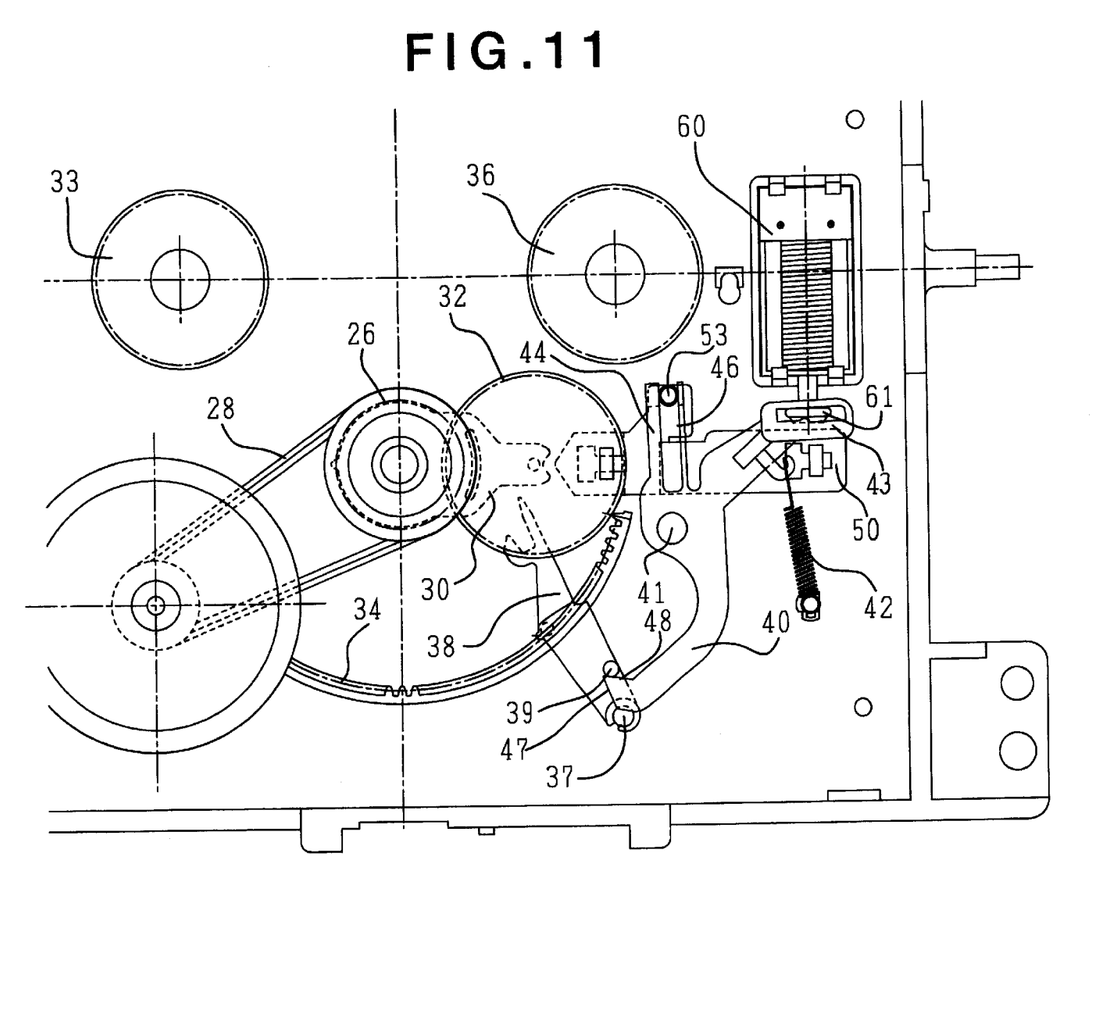
FIG. 11 is an enlarged bottom view showing the one tape deck that has just been unlocked from the inoperative position of FIG. 10.

FIGS. 10 and 11 illustrates another modified embodiment in which spring 54 is replaced by a resilient leg 46 formed integral with trigger arm 40 in parallel with extension 44 so that pin 53 of pause lever 50 is engaged between extension 44 and leg 46 of trigger arm 40. In this modification, leg 46 acts as a spring, like spring 54, which allows pause lever 50 to move rightward when rotary arm 30 rotates clockwise with pin 31 being in contact with lower cut-out edge 56 (in FIGS. 1–8) or 62 (in FIG. 9).

In the modification of FIGS. 10 and 11, trigger arm 40 has a wedge-shaped tip end that engages with pin 39 of push lever 38. Pin 39 engages a lower edge 47 of the wedge-shaped tip end to rotate trigger arm 40 counterclockwise in the drawing, about shaft 41. Suppose that tape deck 12 is in the inoperative position such as shown in FIG. 10 and solenoid 60 is empowered. As described before, trigger arm 40 rotates clockwise about shaft 41 to unlock pin 31. At this time, pin 39 is automatically engaged by an upper edge 48 of the wedge-shaped tip end of trigger arm 40 so that push lever 38 remains standstill at a position shown in FIG. 11.

Although the present invention has been described and illustrated in conjunction with specific embodiments thereof, it is to be understood that the present invention is not limited to these embodiments and involves various changes and modifications within the spirit and scope of the invention defined in the appended claims. For example, though both tape decks 12, 14 have one-way tape running mechanism in the illustrated embodiments, main deck 14 may be of auto-reverse type. Tape deck 12 is used only at the time of dubbing in the illustrated embodiments, but both decks 12, 14 may be equipped with reproducing and recording capacity. In this case, the above-described mechanism (comprising push lever 38, trigger arm 40, pause lever 50, solenoid 60 etc.) for retaining rotary arm 32 in the neutral position between inner gear 34 and rewind reel drive gear 36 should be mounted on both decks 12 and 14. Except for dubbing, the user designates one of decks 12, 14 that he wishes to drive, so that the other deck is automatically moved to the inoperative position.

What is claimed is:

1. In a double cassette tape player (10) having a single motor (16) rotatable in forward and reverse directions and a pair of tape decks (12), (14) that can be driven by the motor through separate drive mechanisms, each of the drive mechanisms including a rotation transmission gear (32) which is driven by the motor and capable of meshing with one of reel drive gears (33), (36) so that a tape in a cassette carried on the tape deck is to run in a predetermined direction, a mechanism for retaining one of the tape decks into a temporal inoperative position where the rotation transmission gear does not mesh with the reel drive gear, comprising:

a trigger arm (40) rotatable about a first pivot (41) on a chassis (15) of said one tape deck;

first spring means (42) for biasing said trigger arm to rotate in a predetermined direction;

a pause lever (50) slideable on said chassis of said one tape deck;

second spring means (54) for urging said pause lever to move in a predetermined direction;

actuator means (38) that is made operative in response to rotation of said motor to urge said trigger arm to rotate in a direction opposite to said predetermined direction of rotation, against the biasing force of said first spring means;

said pause lever being allowed to be slid in said predetermined direction by the biasing force of said second spring means when said trigger arm is caused by said actuator means to rotate in said opposite direction; and lock means (55) provided at a tip end of said pause lever for engagement with a part of the drive mechanism between said motor and said rotation transmission gear, when said pause lever is slid in said predetermined direction, thereby locking said rotation transmission gear in a lock position just before a position where it meshes with said reel drive gear, said rotation transmission gear being idle in said lock position while being kept driven by the motor.

2. The mechanism according to claim 1 wherein said actuator means comprises a push lever (38) rotatable about a second pivot (37) on said chassis of said one tape deck, said push lever being rotated in a predetermined direction in response to movement of said rotation transmission gear by rotation of said motor, said push lever having an integral part (39) engageable with one extreme end (45) of said trigger arm.

3. The mechanism according to claim 1 which further comprises positioning means (60) for keeping said trigger arm into a predetermined angle of rotation, when said trigger arm is rotated in said opposite direction by said actuator means.

4. The mechanism according to claim 3 wherein said positioning means comprises a solenoid (60) of a permanent magnetic type, said solenoid being empowered with electricity to release its magnetic power, which allows said trigger arm to rotate in said predetermined direction of rotation in cooperation with said first spring, thereby urging said pause lever to be slid in a direction opposite to said predetermined direction, against the biasing force of said second spring means, and releasing said rotation transmission gear from said lock position.

5. The mechanism according to claim 4 wherein said lock means comprises a recess (55) formed at the tip end of said pause lever for receiving a first pin (31) that provides an axis of rotation of said rotation transmission gear.

6. The mechanism according to claim 5 wherein the tip end of said pause lever provides an inclined edge (56) adjacent below to said recess, said inclined edge being in contact with said first pin, just before said pin is to be received within said recess, and acting as a guide to urge said pause lever to be slid in said opposite direction, while maintaining said trigger arm in said predetermined angle of rotation defined by said positioning means.

7. The mechanism according to claim 1 which further comprises interlocking means consisting of a first member (44) integral with said trigger arm and a second member (53) integral with said pause lever, said first and second members being usually in contact with each other.

8. The mechanism according to claim 7 wherein said first member is a first extension (44) of said trigger arm and said second member is a second pin (53) at one extreme end of said pause lever, said second pin being usually interposed between said first extension and said second spring means.

9. The mechanism according to claim 8 wherein said second spring means comprises an elongated second extension (46) spaced, substantially in parallel with said first extension of said trigger arm, said second pin being interposed between said first and second extensions.

* * * * *